United States Patent
Urbina (10) Patent No.: US 10,145,217 B2
(45) Date of Patent: Dec. 4, 2018

(54) CHEMICAL ATTENUATOR SLEEVE

(71) Applicant: Saudi Arabian Oil Company, Dhahran (SA)

(72) Inventor: Rommel Ernesto Arias Urbina, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 145 days.

(21) Appl. No.: 15/283,505

(22) Filed: Oct. 3, 2016

(65) Prior Publication Data

US 2018/0094507 A1    Apr. 5, 2018

(51) Int. Cl.
| | |
|---|---|
| *E21B 43/08* | (2006.01) |
| *E21B 41/02* | (2006.01) |
| *C09K 8/70* | (2006.01) |
| *E21B 33/12* | (2006.01) |
| *E21B 43/26* | (2006.01) |

(52) U.S. Cl.
CPC ............... *E21B 41/02* (2013.01); *C09K 8/70* (2013.01); *E21B 33/12* (2013.01); *E21B 43/08* (2013.01); *E21B 43/086* (2013.01); *E21B 43/26* (2013.01); *C09K 2208/12* (2013.01); *C09K 2208/32* (2013.01)

(58) Field of Classification Search
CPC ......... E21B 37/06; E21B 41/02; E21B 43/086
See application file for complete search history.

(56) References Cited

U.S. PATENT DOCUMENTS

| | | | |
|---|---|---|---|
| 3,614,985 A | 10/1971 | Richardson | |
| 4,202,411 A | 5/1980 | Sharp et al. | |
| 4,239,084 A | 12/1980 | Sharp et al. | |
| 5,725,906 A | 3/1998 | Allen | |
| 7,527,102 B2 | 5/2009 | Crews et al. | |
| 9,228,243 B2 | 1/2016 | Waite et al. | |
| 2006/0037752 A1 | 2/2006 | Penno et al. | |
| 2008/0164027 A1* | 7/2008 | Sanchez | E21B 43/04 166/278 |
| 2008/0251250 A1 | 10/2008 | Brezinski et al. | |

(Continued)

FOREIGN PATENT DOCUMENTS

WO    2016014310    1/2016

OTHER PUBLICATIONS

International Search Report and Written Opinion for International Application No. PCT/US2017/054825; International Filing Date Oct. 3, 2017; dated Jan. 29, 2018 (pp. 1-14).

*Primary Examiner* — Giovanna C. Wright
(74) *Attorney, Agent, or Firm* — Bracewell LLP; Constance G. Rhebergen; Vivek P. Shankam (57) ABSTRACT

A chemical attenuator sleeve for mitigating chemical reaction in a well borehole includes an inner member having a plurality of perforations, a first outer member disposed on an outer circumference of the inner member, a second outer member at least partially enveloping the first outer member, the second outer member having an outer diameter that is greater than an outer diameter of the first outer member, and a chemical composition disposed between the outer diameter of the first outer member and an inner diameter of the second outer member. The chemical composition may include MgO, Mg(OH)$_2$, CaO, Ca(OH)$_2$, NaOH, and mixtures thereof.

14 Claims, 7 Drawing Sheets

(56) References Cited

U.S. PATENT DOCUMENTS

2011/0265990 A1\* 11/2011 Augustine ............... E21B 43/08
                                                          166/230
2013/0327528 A1   12/2013 Frost
2014/0262260 A1    9/2014 Mayer et al.
2016/0024891 A1    1/2016 Fursdon-Welsh et al.

\* cited by examiner

| [A] (mol/L) | 1 | $10^{-1}$ | $10^{-2}$ | $10^{-3}$ | $10^{-4}$ | $10^{-5}$ | $10^{-6}$ | $10^{-7}$ | $10^{-10}$ |
|---|---|---|---|---|---|---|---|---|---|
| Initial pH | 0.00 | 1.00 | 2.00 | 3.00 | 4.00 | 5.00 | 6.00 | 6.79 | 7.00 |
| Final pH | 6.75 | 7.25 | 7.75 | 8.14 | 8.25 | 8.26 | 8.26 | 8.26 | 8.27 |
| Dissolved $CaCO_3$ (g per liter of acid) | 50.0 | 5.00 | 0.514 | 0.0849 | 0.0504 | 0.0474 | 0.0471 | 0.0470 | 0.0470 |

FIG. 7

CHEMICAL ATTENUATOR SLEEVE

TECHNICAL FIELD

Example embodiments relate to a chemical attenuator sleeve for use during hydraulic fracturing of subsurface formations.

BACKGROUND

Hydrocarbons sometimes exist in a formation but cannot flow readily into the well because the formation has very low permeability. In order for hydrocarbons to travel from the formation to the wellbore there must be a flow path from the formation to the wellbore. This flow path is through the formation rock and has pores of sufficient size and number to allow a conduit for the hydrocarbons to move through the formation. In some subterranean formations containing hydrocarbons, the flow paths are of low incidence or occurrence and/or size that efficient hydrocarbon recovery is hampered.

With respect to wells that previously produced satisfactorily, a common reason for a decline in oil and gas production from a particular formation is damage to the formation that plugs the rock pores and impedes the flow of oil to the wellbore and ultimately to the surface.

Well stimulation refers to the various techniques employed to improve the permeability of a hydrocarbon-bearing formation. Three general well-stimulation techniques are typically employed. The first involves injecting chemicals into the wellbore to react with and dissolve permeability damaging materials such as wellbore coatings, e.g. as may remain from previously used drilling fluids. A second method requires injecting chemicals through the wellbore and into the formation to react with and dissolve small portions of the formation thereby creating alternative flow paths for the hydrocarbons to flow to the wellbore. These alternative flow paths redirect the flow of hydrocarbons around the low permeability or damaged areas of the formation. A third technique, often referred to as fracturing, involves injecting chemicals into the formation at pressures sufficient to actually fracture the formation, thereby creating a relatively large flow channel though which hydrocarbon can more readily move from the formation and into the wellbore.

Acidizing treatments of wells are a conventional process for increasing or restoring the permeability of subterranean formations so as to facilitate the flow of oil and gas from the formation into the well. The acid treatment is to remove formation damage along as much of the hydrocarbon flow path as possible, and/or to create new flow paths. An effective treatment should remove as much damage as possible along the entire flow path. This process involves treating the formation with an acid to dissolve fines and carbonate scale plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore.

More recently, multi stage fracture (MSF) systems have been used in several horizontal boreholes as another form of well stimulation technique. These systems provide a unique way to create compartments along the well, where packers, mechanical or swellable, may provide a hydraulic seal to stimulate that particular section of the well. By stimulating each compartment individually, the stimulated contact area between the formation and well increases, thus positively affecting the hydrocarbon production performance. However, in such cases hydraulic isolation between compartments is compromised due chemical reaction between the stimulation fluid and rock or reservoir behind the packer elements. MSF systems may use this acid to stimulate the carbonate formation, and may be normally orientated to breakdown the formation and create hydraulic fractures in the formation by using a combination of reactive and non-reactive fluids. Conventional acidizing fluids, such as hydrochloric acid or a mixture of hydrofluoric and hydrochloric acids, have high acid strength and quick reaction with fines and scale nearest the well bore. These particular acids, however, have a tendency to corrode tubing, casing and down hole equipment, such as gravel pack screens and down hole pumps, especially at elevated temperatures, in particular, above 200° F. (92° C.). In many cases organic acids are used in place of hydrochloric acid, such as formic and acetic acids. However, even if the packer elements and fracture port are placed in the right places, the reactive fluid movement near the packer elements can be minimal and depends just on the reservoir injectivity or mobility, which may be dictated by the permeability of the formation and the reservoir pressure.

SUMMARY

Accordingly, one example embodiment of the present disclosure is a system for mitigating chemical reaction in a well borehole. The system includes a plurality of sections of tubing connected by a plurality of hydraulic fracturing ports, a plurality of annular isolators disposed on an outer circumference of the tubing for isolating the tubing from an inner wall of the well borehole, and a chemical attenuator sleeve disposed between at least two annular isolators. The chemical attenuator sleeve includes an inner tubing having a plurality of perforations, a first outer tubing disposed on an outer circumference of the inner tubing, a second outer tubing at least partially enveloping the first outer tubing, the second outer tubing having an outer diameter that is greater than an outer diameter of the first outer tubing, and a chemical composition disposed between the outer diameter of the first outer tubing and an inner diameter of the second outer tubing. The chemical composition may include at least one of $MgO$, $Mg(OH)_2$, $CaO$, $Ca(OH)_2$, $NaOH$, and mixtures thereof. The chemical composition may be in the form of pellets, spherical balls, or spheroids. The plurality of annular isolators may include a primary annular isolator and a secondary annular isolator, wherein the primary annular isolator has a length that is greater than a length of the secondary annular isolator. The first outer tubing or the second outer tubing may include at least one of a sand screen, a filter, a mechanical protector, and a shield. The sand screen, filter, mechanical protector or shield includes a plurality of horizontal circumferential grooves formed on an outer surface thereof.

Another example embodiment is a method for mitigating chemical reaction in a well borehole. The method may include connecting a plurality of sections of tubing with a plurality of hydraulic fracturing ports, disposing a plurality of annular isolators on an outer circumference of the tubing for isolating the tubing from an inner wall of the well borehole, and disposing a first chemical attenuator sleeve between a first set of annular isolators. The chemical attenuator sleeve may include an inner tubing having a plurality of perforations, a first outer tubing disposed on an outer circumference of the inner tubing, a second outer tubing at least partially enveloping the first outer tubing, the second outer tubing having an outer diameter that is greater than an outer diameter of the first outer tubing, and a chemical composition disposed between the outer diameter of the first outer tubing and an inner diameter of the second outer tubing. The chemical composition includes at least one of MgO, $Mg(OH)_2$, CaO, $Ca(OH)_2$, NaOH, and mixtures thereof. The chemical composition is in the form of pellets, spherical balls, or spheroids. The method may also include injecting an acid through the inner tubing and through the chemical attenuator sleeve, thereby minimizing the dissolution of the acid by increasing the pH of the acid to about 4 or more. The acid may be selected from the group consisting of hydrochloric acid, hydrofluoric acid, formic acid, acetic acid, dicarboxylic acids, and mixtures thereof. The plurality of annular isolators may include a primary annular isolator and a secondary annular isolator, wherein the primary annular isolator has a length that is greater than a length of the secondary annular isolator. The first outer tubing or the second outer tubing includes at least one of a sand screen, a filter, a mechanical protector, and a shield. The method may also include disposing a second chemical attenuator sleeve between a second set of annular isolators, the second chemical attenuator sleeve having a length that is longer than the length of the first chemical attenuator sleeve.

Another example embodiment is an apparatus for mitigating chemical reaction in a well borehole. The apparatus may include an inner member having a plurality of perforations, a first outer member disposed on an outer circumference of the inner member, a second outer member at least partially enveloping the first outer member, the second outer member having an outer diameter that is greater than an outer diameter of the first outer member, and a chemical composition disposed between the outer diameter of the first outer member and an inner diameter of the second outer member. The chemical composition may include at least one of MgO, $Mg(OH)_2$, CaO, $Ca(OH)_2$, NaOH, and mixtures thereof. The chemical composition may be provided in the form of pellets, spherical balls, or spheroids. The apparatus may also include plurality of annular isolators including a primary annular isolator and a secondary annular isolator, wherein the primary annular isolator has a length that is greater than a length of the secondary annular isolator. The first outer member or the second outer member may include at least one of a sand screen, a filter, a mechanical protector, and a shield. The sand screen, filter, mechanical protector or shield may include a plurality of horizontal circumferential grooves formed on an outer surface thereof.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

The terms "annular isolator" or "packer element" as used herein mean a material or mechanism or a combination of materials and mechanisms which block or prevent flow of fluids from one side of the isolator to the other in the annulus between a tubular member in a well and a borehole wall or casing. An annular isolator acts as a pressure bearing seal between two portions of the annulus. Since annular isolators must block flow in an annular space, they may have a ring like or tubular shape having an inner diameter in fluid tight contact with the outer surface of a tubular member and having an outer diameter in fluid tight contact with the inner wall of a borehole or casing. An annular isolator could be formed by tubing itself if it could be expanded into intimate contact with a borehole wall to eliminate the annulus. An isolator may extend for a substantial length along a borehole. In some cases, as described below, a conduit may be provided in the annulus passing through or bypassing an annular isolator to allow controlled flow of certain materials, e.g. hydraulic fluid, up or down hole.

The term "perforated" as used herein, e.g. perforated tubing or perforated liner, means that the member has holes or openings through it. The holes can have any shape, e.g. round, rectangular, oval, slotted, etc. The term is not intended to limit the manner in which the holes are made, i.e. it does not require that they be made by perforating the metal.

Figure 1:
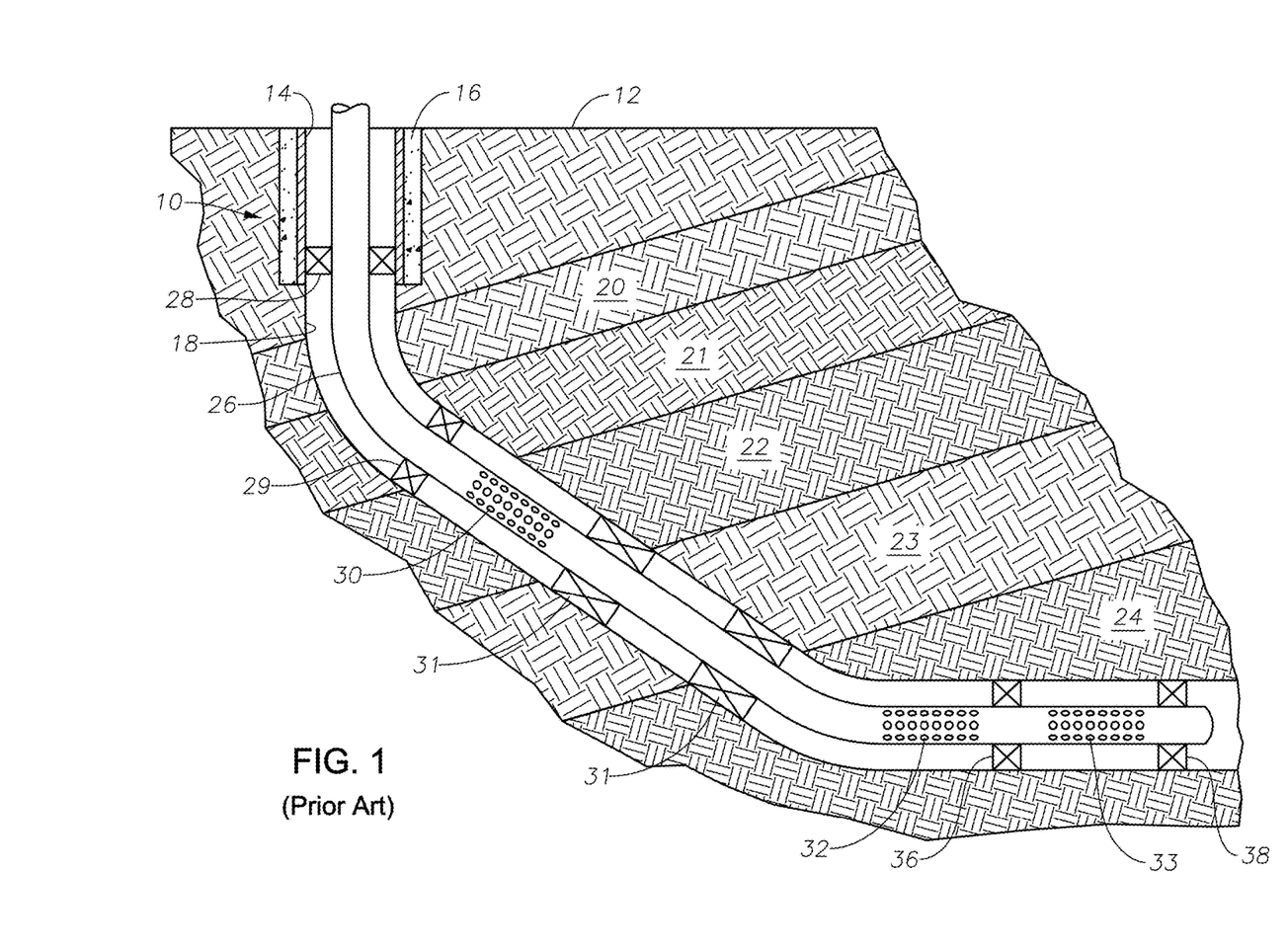
FIG. 1 illustrates a hydrocarbon well with a conventional tubing and an annular isolator or packer element, according to teachings of the prior art.

With reference now to FIG. 1, there is provided an example of a producing oil well with an annular isolator or packer element. In FIG. 1, a borehole 10 has been drilled from the surface of the earth 12. An upper portion of the borehole 10 has been lined with casing 14 which has been sealed to the borehole 10 by cement 16. Below the cased portion of borehole 10 is an open hole portion 18 which extends downward and then laterally through various earth formations. For example, the borehole 18 may pass through a water bearing zone 20, a shale layer 21, an oil bearing zone 22, a nonproductive zone 23 and into another oil bearing zone 24. As illustrated in FIG. 1, the open hole 18 has been slanted so that it runs through the zones 20-24 at various angles and may run essentially horizontally through oil-bearing zone 24. Slant hole or horizontal drilling technology allows such wells to be drilled for thousands of feet away horizontally from the surface location of a well and allows a well to be guided to stay within a single zone if desired. Wells following an oil bearing zone will seldom be exactly horizontal, since oil bearing zones are normally not horizontal.

Tubing 26 has been placed to run from the lower end of casing 14 down through the open hole portion of the well 18. At its upper end, the tubing 26 is sealed to the casing 14 by an annular isolator 28. Another annular isolator 29 seals the annulus between tubing 26 and the wall of borehole 18 within the shale zone 21. It can be seen that isolators 28 and 29 prevent annular flow of fluid from the water zone 20 and thereby prevent production of water from zone 20. Within oil zone 22, tubing 26 has a perforated section 30. Section 30 may be a perforated liner and may typically carry sand screens or filters about its outer circumference. A pair of annular isolators 31 prevents annular flow to, from or through the nonproductive zone 23. The isolators 31 may be a single isolator extending completely through the zone 23 if desired. The combination of isolator 29 and isolators 31 allow production from oil zone 22 into the perforated tubing section 30 to be selectively controlled and prevents the produced fluids from flowing through the annulus to other parts of the borehole 18. Within oil zone 24, tubing 26 is illustrated as having two perforated sections 32 and 33. Sections 32 and 33 may be perforated and may typically carry sand screens or filters about their outer circumference. Annular isolators 36 and 38 are provided to seal the annulus between the tubing 26 and the wall of open borehole 18. The isolators 31, 36 and 38 allow separate control of flow of oil into the perforated sections 32 and 33 and prevent annular flow of produced fluids to other portions of borehole 18. The horizontal section of open hole 18 may continue for thousands of feet through the oil bearing zone 24. The tubing 26 may likewise extend for thousands of feet within zone 24 and may include numerous perforated sections, which may be divided by numerous annular isolators, such as isolators 36 and 38, to divide the zone 24 into multiple areas for controlled production.

Tubing 26 may comprise one or more expandable tubular sections. Both the solid sections of the tubing 26 and the perforated sections 32 and 33 can be expandable. The use of expandable tubing may provide numerous advantages. The tubing may be of reduced diameter during installation, which facilitates installation in offset, slanted or horizontal boreholes. Upon expansion, solid, or perforated tubing and screens provide support for uncased borehole walls while screening and filtering out sand and other produced solid materials which can damage tubing. After expansion, the internal diameter of the tubing is increased improving the flow of fluids through the tubing. Since there are limits to which expandable tubing 26 may be expanded and the borehole walls are irregular and may actually change shape during production, annular flow cannot be prevented merely by use of expandable tubing 26, including expandable perforated sections and screens 32 and 33. To achieve the desirable flow control, annular barriers or isolators 36 and 38 may be needed.

Figure 2:
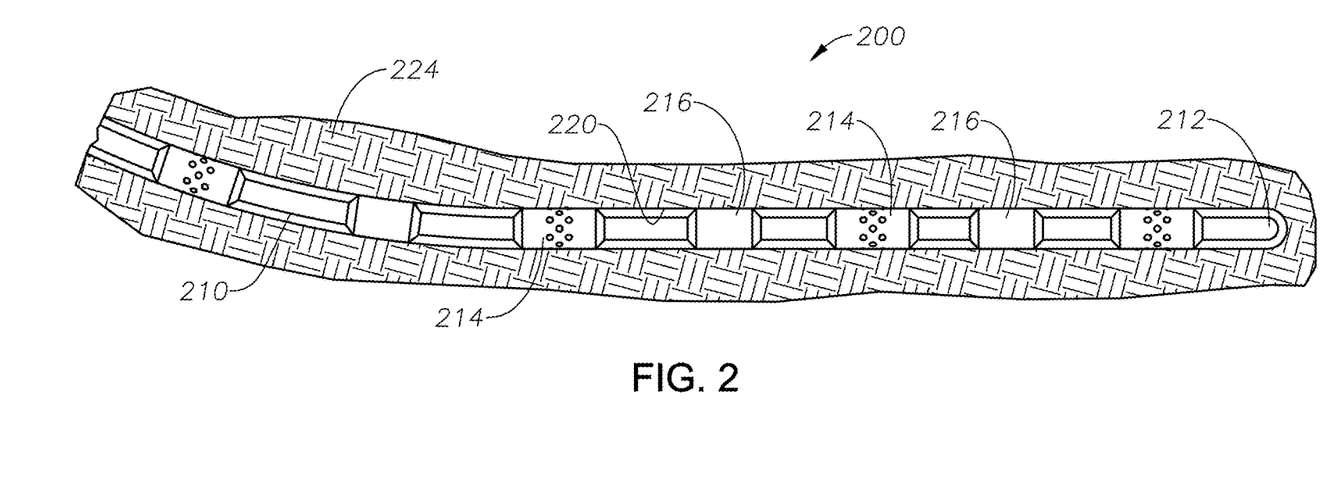
FIG. 2 illustrates an example system installed in a well borehole, according to one or more example embodiments of the disclosure.

FIG. 2 illustrates an example system 200 installed in a well borehole 220, according to one or more example embodiments of the disclosure. The system 200 may include one or more of sections of a tubing 210 that may be connected, for example, by a plurality of hydraulic fracturing ports 214. The system may also include a plurality of annular isolators or packer elements 216 that may be disposed on an outer circumference of the tubing 210 for isolating the tubing 210 from an inner wall of the well borehole 220. The nose of the tubing 212 may drive the body of the assembly through the borehole 220. An example hydrocarbon formation site is indicated by carbonate reservoir 224 purely for illustrative purposes.

Figure 3A:
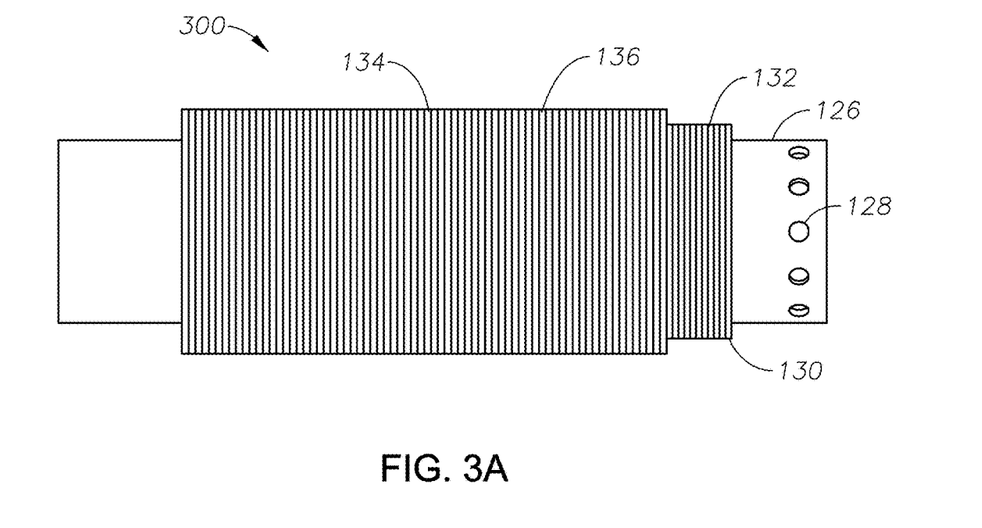
FIGS. 3A-D illustrate schematics of a chemical attenuator sleeve for use in a system, according to one or more example embodiments of the disclosure.
Figure 3B:
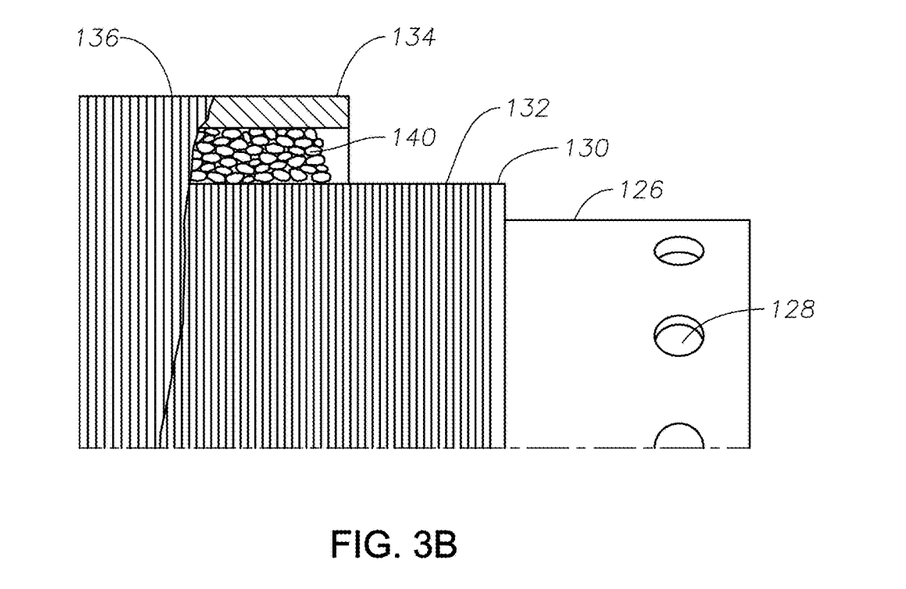
Figure 3C:
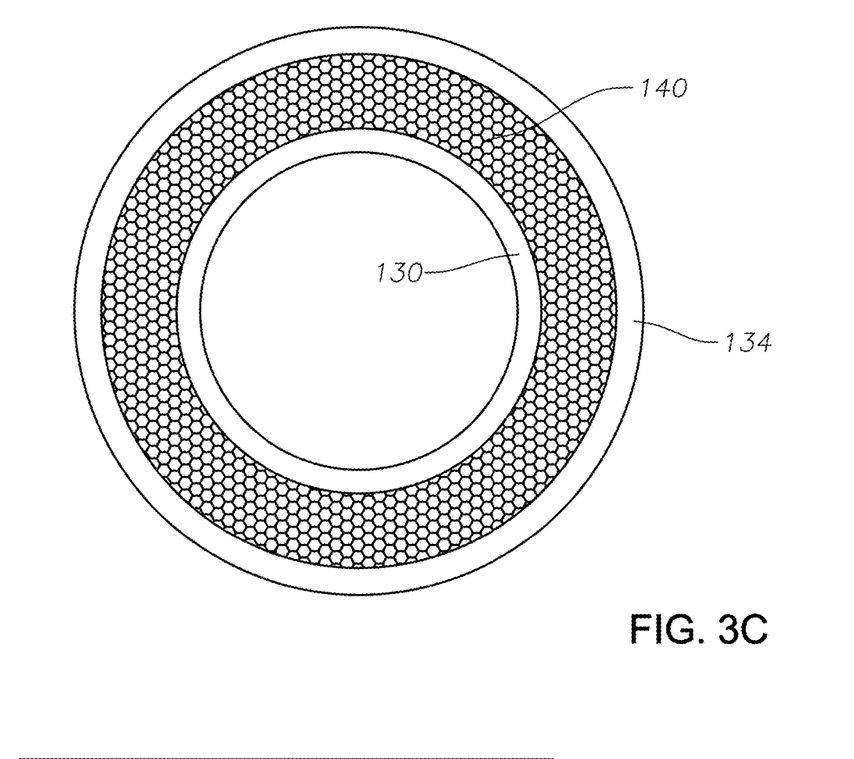
Figure 3D:
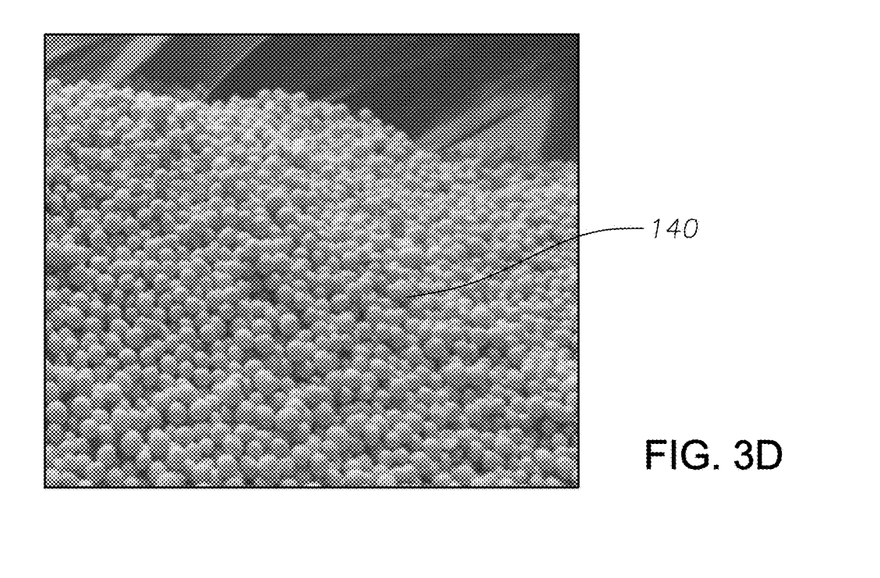

FIGS. 3A-D illustrate schematics of a chemical attenuator sleeve 300 for use in a system 200, according to one or more example embodiments of the disclosure. As shown in FIG. 3A, the sleeve 300 may include an inner member or tubing 126 having a plurality of perforations 128. The sleeve 300 may also include a first outer member or tubing 130 disposed on an outer circumference of the inner member or tubing 126. A second outer member or tubing 134 may at least partially envelope the first outer member or tubing 130. The second outer member or tubing 134 may have an outer diameter that is greater than an outer diameter of the first outer member or tubing 130. As shown in FIG. 3B, for example, the sleeve 300 may be pre-packed with a chemical composition 140 that may be disposed between the outer diameter of the first outer member or tubing 130 and an inner diameter of the second outer member or tubing 134. The chemical composition may include at least one of MgO, $Mg(OH)_2$, CaO, $Ca(OH)_2$, NaOH, and mixtures thereof. The chemical composition may be provided in the form of pellets, as illustrated in FIG. 3B, or in the form of spherical balls, or spheroids, as illustrated in FIGS. 3C-D. The first outer member or tubing 130 and/or the second outer member or tubing 134 may include a sand screen, a filter, a mechanical protector, or a shield. The sand screen, filter, mechanical protector or shield may include a plurality of horizontal circumferential grooves 132, 136 formed on an outer surface thereof.

The chemical attenuator sleeve 300 can mitigate or eliminate chemical reaction between an acid that may be injected through the tubing 210 and the carbonate formation near the annular insulators or packer elements 216 by using the selective chemical reaction material 140. Multi stage fracture (MSF) systems implementing this sleeve 300 may have better pressure isolation performance in each compartment, thus increasing the effective stimulated area per well, and subsequently increasing hydrocarbon production. The chemical attenuator sleeve 300 can be placed as barrier that will react first with the acid, minimizing the dissolution of acid by increasing the pH of the acid to about 4 or more in that particular section of the system. The acid may be selected from the group consisting of hydrochloric acid, hydrofluoric acid, formic acid, acetic acid, dicarboxylic acids, and mixtures thereof. When the reactive fluid starts to interact with the formation behind the packers 216, the fluid moves into this chemical attenuator sleeve 300, reacting first with chemical components like MgO and CaO, which have higher surface area and faster chemical reaction rate that any limestone or dolomite carbonate present at the hydrocarbon formation.

Figure 4:
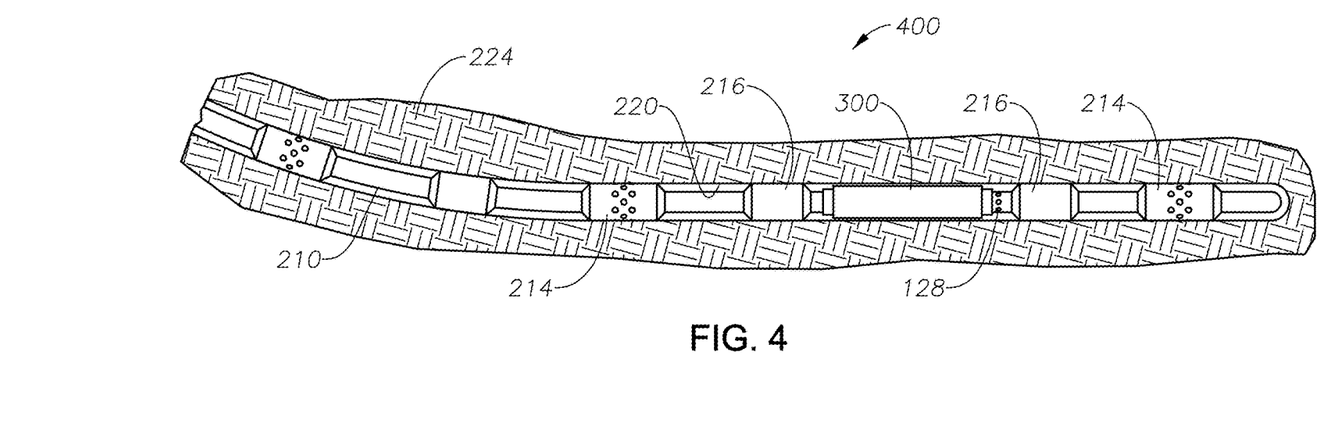
FIG. 4 illustrates an example system installed in a well borehole, according to one or more example embodiments of the disclosure.

FIG. 4 illustrates an example system 400 installed in a well borehole 220, according to one or more example embodiments of the disclosure. The system 400 may include, in addition to the other elements shown in FIG. 2, a chemical attenuator sleeve 300 which may be disposed between two annular isolators or packer elements 216. The chemical attenuator sleeve 300 may have a structure, as described in FIGS. 3A-D, for example. The chemical composition in the chemical attenuator sleeve 300 may include at least one of MgO, Mg(OH)$_2$, CaO, Ca(OH)$_2$, NaOH, and mixtures thereof. The chemical composition may be in the form of pellets, spherical balls, or spheroids. System 400 may be used for mitigating chemical reaction in a specific area, for example, between the annular isolators or packer elements 216 and the insides of the well borehole 220.

Figure 5:
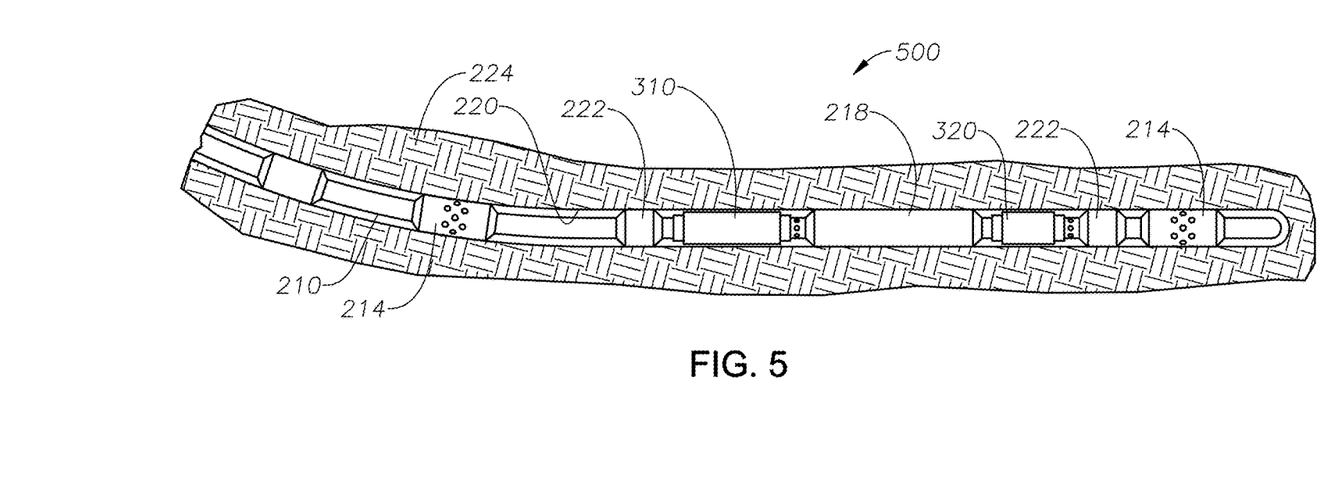
FIG. 5 illustrates an example system installed in a well borehole, according to one or more example embodiments of the disclosure.

FIG. 5 illustrates another example system 500 installed in a well borehole 220, according to one or more example embodiments of the disclosure. In this configuration, the sleeve 300 can be divided into smaller compartments 310, 320 separated by half or one feet packer elements 218, 222 to increase the chemical attenuation effect. Although MgO and CaO provide the best efficiency in terms of mass of neutralizer versus mass to neutralized, other components like specific metals, for example aluminum, with high surface area could also be implemented to increase pH level in the acid near the packers 218, 222.

Another example embodiment is a method for mitigating chemical reaction in a well borehole 220, as illustrated in FIG. 5. The method may include connecting a plurality of sections of tubing 210 with a plurality of hydraulic fracturing ports 214. The method also includes disposing a plurality of annular isolators 218, 222 on an outer circumference of the tubing 210 for isolating the tubing 210 from an inner wall of the well borehole 220. The method may also include disposing a first chemical attenuator sleeve 310 between a first set of annular isolators 218. The chemical attenuator sleeve 310 may have a structure as illustrated in FIGS. 3A-D, for example. A special reactive chemical material may be disposed between the outer diameter of the first outer tubing and an inner diameter of the second outer tubing in the sleeve 310. The chemical composition or material may include at least one of MgO, Mg(OH)$_2$, CaO, Ca(OH)$_2$, NaOH, and mixtures thereof. The chemical composition may be in the form of pellets, spherical balls, or spheroids, as described in the above example embodiments.

In some embodiments, the method may also include injecting an acid through the inner tubing and through the chemical attenuator sleeve 310, 320, thereby minimizing the dissolution of the acid by increasing the pH of the acid to about 4 or more. The acid may be selected from the group consisting of hydrochloric acid, hydrofluoric acid, formic acid, acetic acid, dicarboxylic acids, and mixtures thereof. The plurality of annular isolators or packer elements 218, 222 may include a primary annular isolator 218 and a secondary annular isolator 222. The primary annular isolator 218 may have a length that is greater than a length of the secondary annular isolator 222. The method may also include disposing a second chemical attenuator sleeve 320 between a second set of annular isolators 222. The second chemical attenuator sleeve 222 may have a length that is shorter than the length of the first chemical attenuator sleeve 218.

The chemical attenuator sleeves 310, 320 can mitigate or eliminate chemical reaction between an acid and carbonate formation near the annular insulators or packer elements 218, 222 by using the selective chemical reaction material. MSF systems implementing sleeves 310, 320 may have better pressure isolation performance in each compartment, thus increasing the effective stimulated area per well, and subsequently increasing hydrocarbon production. The chemical attenuator sleeves 310, 320 can be placed as barrier that will react first with the acid, minimizing the dissolution of acid by increasing the pH of the acid to about 4 or more in that particular section of the system. The acid may be selected from the group consisting of hydrochloric acid, hydrofluoric acid, formic acid, acetic acid, dicarboxylic acids, and mixtures thereof. When the reactive fluid starts to interact with the formation behind the packers 218, 222, the fluid may move into the chemical attenuator sleeve 310, 320, reacting first with chemical components like MgO and CaO, which have higher surface area and faster chemical reaction rate that any limestone or dolomite carbonate present at the hydrocarbon formation.

Figure 6:
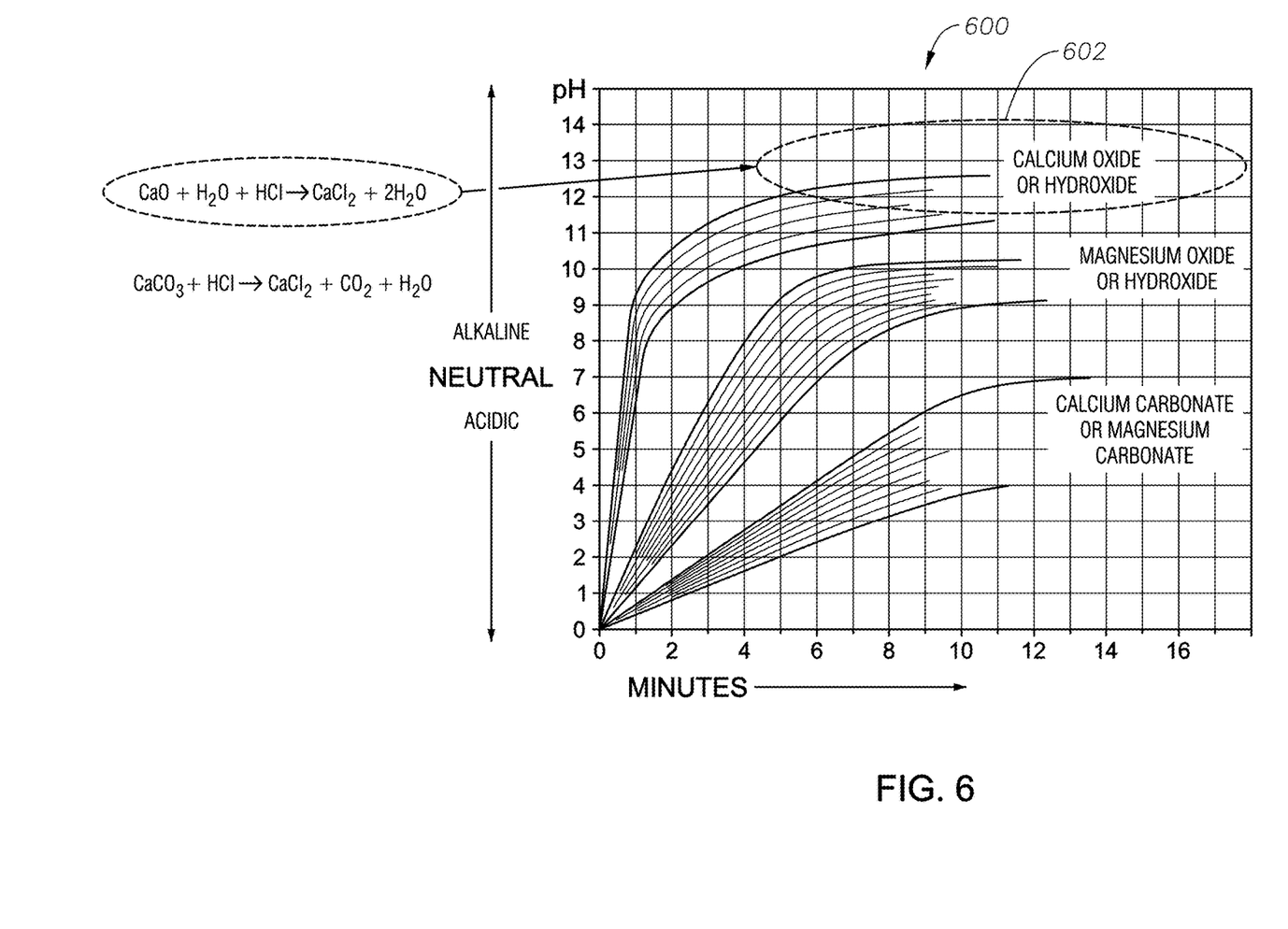
FIG. 6 is a graph illustrating reaction rates of various chemical compositions used in a system, according to one or more example embodiments of the disclosure.

FIG. 6 is an example graph 600 illustrating reaction rates of various chemical compositions used in a system, according to one or more example embodiments of the disclosure. As illustrated, an active component of the chemical attenuator includes MgO and CaO in different proportions by weight and/or volume. These chemicals may be present in the form of small pellets, and thus the contact area of a pre-packed annular sleeve may be several times higher than that of the carbonate formation exposed to acid in an open hole section, which is typically 5⅞" in size. As it can be seen from the graph at 602, the chemical reaction rate is much faster in chemical components like CaO/Ca(OH)$_2$ and MgO/Mg(OH)$_2$ when compared with natural carbonate rock like CaCO$_3$ or CaMg(CO$_3$)$_2$.

Figure 7:
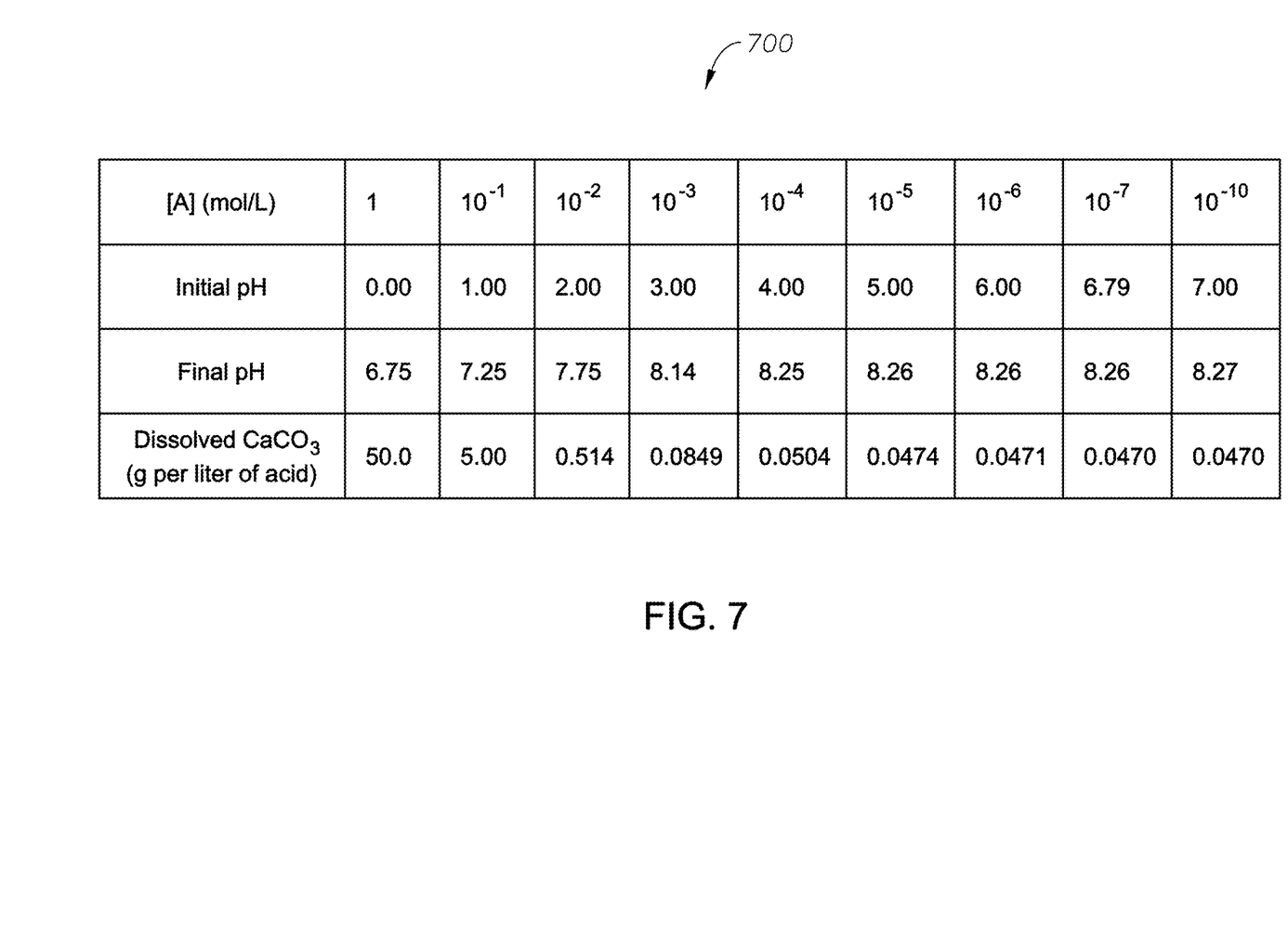
FIG. 7 is a table illustrating decrease in dissolving power of hydrochloric aid with increase in pH of a solution, according to one or more example embodiments of the disclosure.

FIG. 7 is a table illustrating decrease in dissolving power of hydrochloric acid with increase in pH of the acid, according to one or more example embodiments of the disclosure. As it can be seen from the table, the dissolving power of HCl decreases with increase of pH. Based on the previous discussion, the acid (HCl) may react very quickly with the neutralizing agent or chemical composition present in the sleeve, thus increasing the pH of fluid available in the compartment quickly. In this example, molar concentration, also called molarity, amount concentration or substance concentration, may be described as a measure of the concentration of a solute in a solution, or of any chemical species, in terms of amount of substance in a given volume, for example, mol/L.

Many of the above-described embodiments include the use of an expansion type of device for expansion of the tubing. However, one of skill in the art will recognize that many of the same advantages may be gained by using other types of expansion tools such as fluid powered expandable bladders or packers. It may also be desirable to use an expandable bladder in addition to a cone type expansion tool. For example, if a good annular isolator is not achieved after expansion with a cone type tool, an expandable bladder may be used to further expand the isolator to achieve sealing contact with a borehole wall. An expandable bladder may also be used for pressure or leak testing an installed tubing string. For example, an expandable bladder may be expanded inside the tubing at the location where an annular isolator has been installed according to one of the embodiments disclosed herein. The tubing may be pressured up to block flow in the tubing itself to allow detection of annular flow past the installed isolator. If excessive leakage is detected, the bladder pressure may be increased to further expand the isolator to better seal against the borehole wall.

In many of the above described embodiments the system is illustrated using an expansion tool, which travels down hole as it expands expandable tubing and deploys an annular isolator. Each of these systems may operate equally well with an expansion tool, which travels up hole during the tubing expansion process. In some embodiments, the locations of various fracture ports and relief valves may be changed if the direction of travel of the expansion tool is changed. For horizontal boreholes, the term up hole means in the direction of the surface location of a well.

Similarly, while many of the specific preferred embodiments herein have been described with reference to use in open boreholes, similar advantages may be obtained by using the methods and structures described herein to form annular isolators between tubing and casing in cased boreholes. Many of the same methods and approaches may also be used to advantage with production tubing, which is not expanded after installation in a borehole, especially in cased wells.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system for mitigating chemical reaction in a well borehole, the system comprising:
   a plurality of sections of tubing connected by a plurality of hydraulic fracturing ports;
   a plurality of annular isolators disposed on an outer circumference of the tubing for isolating the tubing from an inner wall of the well borehole; and
   a chemical attenuator sleeve disposed between at least two annular isolators, the chemical attenuator sleeve comprising:
      an inner tubing having a plurality of perforations;
      a first outer tubing disposed on an outer circumference of the inner tubing;
      a second outer tubing at least partially enveloping the first outer tubing, the second outer tubing having an outer diameter that is greater than an outer diameter of the first outer tubing; and
      a chemical composition disposed between the outer diameter of the first outer tubing and an inner diameter of the second outer tubing, wherein the chemical composition comprises at least one of MgO, $Mg(OH)_2$, CaO, $Ca(OH)_2$, NaOH, and mixtures thereof.

2. The system of claim 1, wherein the chemical composition is in the form of pellets, spherical balls, or spheroids.

3. The system of claim 1, wherein the plurality of annular isolators comprise a primary annular isolator and a secondary annular isolator, wherein the primary annular isolator has a length that is greater than a length of the secondary annular isolator.

4. The system of claim 1, wherein the first outer tubing or the second outer tubing comprises at least one of a sand screen, a filter, a mechanical protector, and a shield.

5. The system of claim 4, wherein the sand screen, filter, mechanical protector or shield comprises a plurality of horizontal circumferential grooves formed on an outer surface thereof.

6. A method for mitigating chemical reaction in a well borehole, the method comprising:
   connecting a plurality of sections of tubing with a plurality of hydraulic fracturing ports;
   disposing a plurality of annular isolators on an outer circumference of the tubing for isolating the tubing from an inner wall of the well borehole; and
   disposing a first chemical attenuator sleeve between a first set of annular isolators, the chemical attenuator sleeve comprising:
      an inner tubing having a plurality of perforations;
      a first outer tubing disposed on an outer circumference of the inner tubing;
      a second outer tubing at least partially enveloping the first outer tubing, the second outer tubing having an outer diameter that is greater than an outer diameter of the first outer tubing; and
      a chemical composition disposed between the outer diameter of the first outer tubing and an inner diameter of the second outer tubing, wherein the chemical composition comprises at least one of MgO, $Mg(OH)_2$, CaO, $Ca(OH)_2$, NaOH, and mixtures thereof.

7. The method of claim 6, wherein the chemical composition is in the form of pellets, spherical balls, or spheroids.

8. The method of claim 6, further comprising:
injecting an acid through the inner tubing and through the chemical attenuator sleeve, thereby minimizing the dissolution of the acid by increasing the pH of the acid to about 4 or more.

9. The method of claim 8, wherein the acid is selected from the group consisting of hydrochloric acid, hydrofluoric acid, formic acid, acetic acid, dicarboxylic acids, and mixtures thereof.

10. The method of claim 8, wherein the plurality of annular isolators comprise a primary annular isolator and a secondary annular isolator, wherein the primary annular isolator has a length that is greater than a length of the secondary annular isolator.

11. The method of claim 8, wherein the first outer tubing or the second outer tubing comprises at least one of a sand screen, a filter, a mechanical protector, and a shield.

12. The method of claim 8, further comprising:
disposing a second chemical attenuator sleeve between a second set of annular isolators, the second chemical attenuator sleeve having a length that is longer than the length of the first chemical attenuator sleeve.

13. A system for mitigating chemical reaction in a well borehole, the system comprising:
a plurality of sections of tubing connected by a plurality of hydraulic fracturing ports;
a plurality of annular isolators disposed on an outer circumference of the tubing for isolating the tubing from an inner wall of the well borehole; and
a chemical attenuator sleeve disposed between at least two annular isolators, the chemical attenuator sleeve comprising:
an inner tubing having a plurality of perforations;
a first outer tubing disposed on an outer circumference of the inner tubing;
a second outer tubing at least partially enveloping the first outer tubing, the second outer tubing having an outer diameter that is greater than an outer diameter of the first outer tubing; and
a chemical composition disposed between the outer diameter of the first outer tubing and an inner diameter of the second outer tubing, wherein the plurality of annular isolators comprise a primary annular isolator and a secondary annular isolator, wherein the primary annular isolator has a length that is greater than a length of the secondary annular isolator.

14. A method for mitigating chemical reaction in a well borehole, the method comprising:
connecting a plurality of sections of tubing with a plurality of hydraulic fracturing ports;
disposing a plurality of annular isolators on an outer circumference of the tubing for isolating the tubing from an inner wall of the well borehole; and
disposing a first chemical attenuator sleeve between a first set of annular isolators, the chemical attenuator sleeve comprising:
an inner tubing having a plurality of perforations;
a first outer tubing disposed on an outer circumference of the inner tubing;
a second outer tubing at least partially enveloping the first outer tubing, the second outer tubing having an outer diameter that is greater than an outer diameter of the first outer tubing;
a chemical composition disposed between the outer diameter of the first outer tubing and an inner diameter of the second outer tubing; and
injecting an acid through the inner tubing and through the chemical attenuator sleeve, thereby minimizing the dissolution of the acid by increasing the pH of the acid to about 4 or more.

* * * * *